United States Patent Office 2,811,491
Patented Oct. 29, 1957

2,811,491

FERRIC HALIDE-2,3-EPOXYBUTANE CONDENSATION PRODUCTS AS CATALYSTS FOR POLYMERIZATION OF PROPYLENE OXIDE

Malcolm E. Pruitt, Lake Jackson, and Joseph M. Baggett, Freeport, Tex., assignors to The Dow Chemical Company, Midland, Mich., a corporation of Delaware No Drawing. Application April 11, 1955,
Serial No. 500,654

6 Claims. (Cl. 260—2)

This invention relates to certain new catalysts effective in causing the polymerization of propylene oxide to solid polymeric resins. It also concerns methods of making such catalysts, and their use in polymerization of propylene oxide.

As is well known, ethylene oxide may be polymerized to a variety of useful products which range from oily liquids to wax-like solids, depending on the degree of polymerization. The same is true of isobutylene oxide which, in the presence of boron trifluoride, is rapidly converted to a white wax. Quite in contrast, propylene oxide has heretofore shown little or no tendency to form solid polymers. This oxide is known to polymerize rapidly in the presence of alkalies or acids, and even explosively with Friedel-Crafts catalysts such as stannic chloride. However, the products have invariably been viscous liquids of a low degree of polymerization.

It has recently been found that by using certain iron compounds as catalysts, propylene oxide may be converted in good yield to solid polymers having melting points above 50° C., often above 70° C., and average molecular weights over 100,000. These polymers are white resinous products with considerable crystallinity, and have specific gravities in the range 1.03 to 1.05. A detailed description of them, and of their manufacture, stabilization, and use, is given in our co-pending application Serial No. 291,964, filed June 5, 1952, now U. S. Patent 2,706,189. Among the catalysts mentioned in that application as useful in making the new polymers are a number of apparently novel complex iron compounds. Certain of these compounds are described and claimed in our co-pending application Serial No. 291,965, filed June 5, 1952, now U. S. Patent 2,706,181.

The present invention is concerned with certain other apparently novel complex iron compounds, and their use in polymerizing propylene oxide.

The new catalysts are condensates of 2,3-epoxybutane with anhydrous ferric chloride or ferric bromide. In general, they correspond approximately to the empirical formula $FeX_3 \cdot (C_4H_8O)_n$ where X is a halogen of atomic number from 17 to 35 and $n$ has a value from about 0.5 to about 3. They appear to be mixtures of complex salts each containing the ferric halide and epoxybutane in a definite molecular ratio. In the case of ferric chloride, analysis and conductiometric studies have tentatively identified the condensates as mixtures of $2FeCl_3 \cdot C_4H_8O$, $FeCl_3 \cdot C_4H_8O$, $FeCl_3 \cdot 2C_4H_8O$, and $FeCl_3 \cdot 3C_4H_8O$. However, it should be understood that these formulas are empirical only, since analysis of the new products shows part of the chlorine to be inorganically bound and part to be organically bound. The new complexes are ordinarily made as solutions or suspensions in organic media and may be used as such. However, they may be isolated, ranging from heavy oily liquids to powdery solids, all reddish brown to dark brown in color and unstable in moist air.

The new catalytic products are made by adding 2,3-epoxybutane very gradually with agitation to a body of anhydrous ferric halide. Vigorous exothermic reaction occurs in the early stages of addition. The temperature during condensation should be maintained between 0° C. and 100° C., preferably below 20° C. by supplying cooling and by limiting the rate of adding epoxybutane to avoid overheating. Catalytically effective condensates are produced when the epoxybutane is reacted in a proportion of from about 0.5 to about 3 moles of epoxybutane per mole of ferric halide ($FeX_3$). However, as a practical matter in making the complexes, the gradual addition of epoxybutane to the ferric halide is ordinarily continued until the addition of a further small proportion of the epoxide results in no further evolution of heat. This point is usually reached when from 2 to 3 moles of epoxide have been added per mole of ferric chloride.

To insure good temperature control during formation of the complex catalyst, the condensation is preferably carried out in the presence of an inert non-aqueous diluent. The medium either may be a solvent for the anhydrous ferric chloride or may be a non-solvent suspending medium. Diethyl ether is the preferred diluent both because of its excellent dissolving power with regard to ferric chloride and because it tends to limit temperature rise by boiling if excessive evolution of heat occurs. It is also preferred because, though an excellent solvent for ferric chloride, it is a non-solvent for the complex catalyst, and recovery and purification of the catalyst are facilitated. However, ethanol, ethyl acetate, carbon tetrachloride, 2-nitropropane, 1,1-dichloro-1-nitropropane, acetophenone, dichlorodiethyl ether, and triglycol dichloride may be used as solvents. Among the non-solvent media, low-boiling liquid aliphatic hydrocarbons are perhaps most satisfactory, e. g. n-hexane. For ease of operation, solvent media are preferred over non-solvent, mainly because of the rather sticky character of ferric halide suspensions.

The proportion of solvent or non-solvent used is not critical, and may range from zero, better one or more, up to 30 or more parts by weight of medium per part of ferric halide. With diethyl ether and ferric chloride, a ratio of about 5 to 7 parts of the former per part of the latter seems to give optimum results.

When extreme care is taken in making the complex condensates of the invention, they may be used directly, i. e. without purification, as catalysts for the polymerization of propylene oxide. To this end, all traces of moisture, and of chemically combined water as well, should be absent from the anhydrous ferric halide, the condensation medium, and the epoxybutane. The latter should preferably also be freed from aldehyde impurities, as by fractional distillation in contact with alkali metal hydroxide. The condensation is best carried out in a dried vessel, with air excluded, as by means of a purge of dry nitrogen. The resulting product may be in the form of a solution, suspension, or simple mixture, depending upon the diluent employed. It may, if desired, be used as such as catalyst for the polymerization of propylene oxide. It is preferable, however, to concentrate the active material somewhat, as by evaporating the solvent or suspending medium at reduced pressure, or, in some instances simply by filtration or decantation. When the removal is continued until the medium is entirely gone, and other volatile materials driven off, the catalyst complex is obtained as a reddish-brown to dark brown material which may be thick liquid, or gummy, powdery, or hard solid, or combinations thereof. Conveniently, this complex is then redissolved in a powerful solvent, such as acetone, or, if intended for immediate use, in propylene oxide monomer for convenience in handling.

It is also possible, according to the invention, to prepare catalyst complexes by the interaction of ferric halide and 2,3-epoxybutane carried out with reactants of ordinary purity, e. g. containing up to 0.2 percent or more of water and aldehyde, without the detailed precautions just mentioned. In this case, however, the complex is less active catalytically unless a purification step is carried out. According to one purification process, the mixture containing the impure complex is filtered to isolate the solid complex present, then the solid obtained is first warmed under vacuum to remove all traces of diluent and other volatiles, and the residue is then dissolved in a solvent, such as propylene oxide monomer. The resulting solution is diluted with a non-solvent for the complex such as diethyl ether or carbon tetrachloride. This treatment results in precipitation of the complex catalyst, leaving most of the impurities in solution. The complex may then be separated or filtered off, washed with more non-solvent, and dried.

The dried solid complex condensate is fairly stable when stored in dry closed containers and retains at least part of its catalytic activity for a year or more. However, since the activity decreases on aging, it is most desirable, where possible, to prepare the complex only shortly before using it.

The complex ferric halide-epoxybutane products prepared as explained above are effective catalysts for the conversion to solid polymers of propylene oxide. Polymerization may be carried out en masse or in a non-aqueous inert solvent or suspending medium.

In making solid polymers using the catalyst complexes of the invention, the propylene oxide monomer and the catalyst may simply be charged together into a closed vessel and heated until polymerization is complete. The mixture is advantageously agitated during polymerization. The proportion of the complex catalyst used is small, being satisfactorily from 0.1 to 5 percent by weight of the monomer, preferably 2 to 4 percent. In general, the maximum yields of high molecular weight solid polymer are obtained with the lowest operable proportion of catalyst within the range given. Polymerization temperature is in the range of 40° to 150° C., with 70° to 100° C. being preferred, and 80° about the optimum. Below 70° C. the polymerization time becomes unduly long, whereas at much above 100° C. the yield of high molecular weight polymer is reduced. Within the 40° to 150° temperature range, the polymerization time may vary from 3 to 200 hours, the shorter times being at the higher temperatures. In the preferred range of 70° to 100° C., a time of 24 to 180 hours is usually sufficient to insure substantial completion of the reaction.

Instead of effecting mass polymerization as just described, the procedure may be carried out with the oxide monomer, catalyst, and product all dissolved in an inert solvent. In general, roughly equal proportions of monomer and solvent are used. Preferred solvents are diethyl ether, diisopropyl ether, petroleum ether, benzene, and n-hexane. It is advantageous to choose a solvent which boils at about polymerization temperature and to heat the solution to induce gentle reflux, thereby insuring close control of temperature. The presence of a solvent reduces the rate of polymerization.

The crude product resulting from the polymerization process contains, in addition to the desired solid resin, whatever liquid polymers may have formed, residual oxide monomer, such solvent as was employed, and catalyst residue. This crude material is first warmed if necessary to vaporize off the unreacted monomer and the solvent. The resulting product, a tough rubbery mass of brown color, is treated in any convenient way to remove the iron-containing catalyst residue and to separate the desired solid resin from liquid polymer present. Preferably, the rubbery mass is dissolved in several volumes of solvent for the polymer, e. g. hot acetone, and the solution acidified, as with hydrochloric acid, to convert the iron-containing catalyst to soluble iron salts. The resulting clear yellow solution is then chilled to a temperature sufficiently low to cause the solid polymer present to crystallize out of solution, e. g. below −20° C. The crystalline material may then be further purified by recrystallization from acetone, yielding white solid polymer having a molecular weight sufficiently high that its softening point is over 50° C.

In an alternative purification step, the acetone solution of the crude polymeric product may be treated with a small proportion of water to convert the iron-containing complex to an iron hydroxide precipitate. The latter may be removed by filtration, after which the polymer is recovered by crystallization.

The following examples will further illustrate the invention, but are not to be construed as limiting its scope.

*Example 1*

A complex catalyst was pepared by dissolving 115 parts by weight of anhydrous ferric chloride in 1100 parts of diethyl ether and adding gradually 153 parts of liquid cis-2,3-epoxybutane while stirring and cooling to keep the temperature below 10° C. When condensation ceased, a brown oil layer separated which solidified in a few minutes to a gummy mass. The mixture was chilled overnight at −20° C. and filtered. The residue was then warmed under vacuum to remove volatile matter, leaving 55 parts of a brown hygroscopic solid. The solid residue was further purified by dissolving in 475 parts propylene oxide and adding 1000 parts diethyl ether. The $FeCl_3$-epoxybutane complex thereupon precipitated from solution, and it was filtered, washed once with diethyl ether, and the volatile material removed under vacuum. There was obtained 45 parts of a brown powdery residue.

Into a closed glass vessel was charged 1.5 parts of the catalyst residue together with 100 parts of liquid propylene oxide. The mixture was heated at 80° C. with continuous agitation for 92 hours, until polymerization was complete. There was obtained 99 parts of a hard brown solid polymer. This was broken up into small pieces, dissolved in hot acetone, and sufficient concentrated hydrochloric acid was added to convert the iron-complex present to soluble ferric chloride. The solution was chilled to −20° C., whereupon a solid polymer crystallized out of solution and was separated by filtration. This polymer was then washed with acetone at −20° C. and dried under vacuum, there being finally obtained 49 parts of a fluffy white solid.

The solid polymer was soluble in hot acetone, hot methanol, ethanol, dioxane, benzene, toluene, carbon tetrachloride, tetrahydrofuran, methyl ethyl ketone, nitromethane, and isophorone. It did not dissolve, but swelled to a gel, in ether and ethyl acetate, and was insoluble in dimethyl formamide, monoethanolamine, lard, and peanut oil. It was resistant to water and to aqueous acids and alkalies. A 0.66 percent by weight solution of the polymer in benzene had a viscosity at 25° C. of 1.12 centistokes, corresponding to a specific viscosity of 0.60.

*Example 2*

A catalyst complex prepared as in Example 1 was further concentrated by dissolving 20 parts of the catalyst residue in 100 parts propylene oxide at room temperature and allowing the solution to stand for ½ hour. A brown precipitate formed which was filtered from the solution and dried under vacuum to give 12 parts of a brown powder. This powder was insoluble in propylene oxide, ether, hot water, and cold water. It dissolved in aqueous hydrochloric acid to give a yellow solution. When heated above 180° C., the powder decomposed rapidly.

A series of polymerizations of propylene oxide in various solvents was carried out using as catalyst in each case 2.0 percent by weight of the concentrated ferric chloride-2,3-epoxybutane complex. Each crude polymeric product was treated as in Example 1 to isolate a white solid polymer having a melting point above 50° C. The results of two such polymerizations are given in the following table:

|  | Run A | Run B |
|---|---|---|
| Solvent | Benzene | Petroleum ether |
| Ratio (vol./vol.) solvent/propylene oxide | 1:1 | 1:1 |
| Percent catalyst by weight | 2.0 | 2.0 |
| Polymerization temperature, °C | 80 | 80 |
| Polymerization time (hours) | 113 | 160 |
| Parts by weight crude polymer | 47.6 | 80.0 |
| Parts by weight purified solid polymer | 17.2 | 32.4 |
| Yield of solid polymer (percent) | 36.2 | 40.5 |

Example 3

A charge of 64 grams of anhydrous ferric chloride was dissolved in 450 ml. of diethyl ether and the solution was filtered. To 50 ml. of the clear filtrate trans-2,3-epoxybutane was added dropwise with agitation, the whole being cooled by means of an ice bath. A total of 20 ml. of epoxybutane was added, at which time no further immediate evolution of heat occurred. As the epoxide addition progressed, a reddish-brown oil separated from the solution, gradually becoming a gummy brown solid at the completion of the reaction. The brown solid was filtered from the mixture, washed 5 times with anhydrous diethyl ether, and dried under vacuum to a powdery brown solid residue. The solid was then dissolved in propylene oxide and recrystallized from solution by addition of anhydrous diethyl ether. The complex was again filtered from the mixture and dried under vacuum to a powdery brown solid.

A polymerization charge of 100 parts by weight of propylene oxide and 2 parts by weight of the catalyst, prepared as outlined above, was placed in a sealed glass vessel and agitated at 80° C. for 112 hours. The vessel was cooled to room temperature, opened, and the crude dark brown polymer was removed, there being obtained 84.9 parts by weight of polymer. The crude polymeric product was treated as in previous examples to isolate 42.5 parts by weight of a white solid polymer having a melting point above 50° C. This represents a yield of solid polymer of 51 percent, based on propylene oxide converted.

Example 4

A charge of 15 grams of anhydrous ferric chloride was dissolved in 100 ml. of diethyl ether and the solution filtered. To 50 ml. of the clear filtrate cis-2,3-epoxybutane was added dropwise with agitation, the whole being cooled by means of an ice bath. Approximately 20 ml. of epoxybutane was added, at which time no further immediate evolution of heat occurred. As the epoxide addition progressed, a reddish brown oil separated from the solution, gradually becoming a gummy brown solid at the completion of the reaction. The brown solid was filtered from the mixture, washed 3 times with anhydrous diethyl ether, and dried under vacuum to a powdery brown solid residue. This solid was then dissolved in cis-2,3-epoxybutane and precipitated from solution by the addition of n-hexane. The product was again filtered from the mixture, washed with n-hexane, and dried under vacuum to a powdery brown solid. On analysis it was found to contain 29.8 percent iron, 1.0 percent inorganic chloride, and 23.2 percent organic chloride.

A polymerization charge of 100 parts by weight of propylene oxide and 4 parts by weight of the complex catalyst, prepared as outlined above, was placed in a closed stainless steel vessel and agitated at 80° C. for 40 hours. The vessel was cooled to room temperature, opened, and the crude dark brown polymer was removed, there being obtained 74 parts by weight of the polymer. The crude polymeric product was broken into small pieces, dissolved in hot acetone, and sufficient concentrated hydrochloric acid was added to convert the iron-complex present to soluble ferric chloride. The solution was chilled to −20° C., whereupon a solid polymer crystallized out of solution and was separated by filtration. The polymer was then washed with acetone at −20° C. and dried under vacuum, there being finally obtained 34 parts of a fluffy white solid.

The white solid had a specific gravity of 1.058 and a melting point of 62° to 64° C. The intrinsic viscosity in benzene at 25° C. was found to be 0.58. A 0.24 percent by weight solution of the polymer in benzene had a viscosity at 25° C. of 0.766 centistoke, corresponding to a specific viscosity of 0.151.

What is claimed is:

1. As a new product, a condensation product of a ferric halide and 2,3-epoxybutane corresponding to the empirical formula $FeX_3 \cdot (C_4H_8O)_n$, where X is a halogen of atomic number from 17 to 35 and $n$ has a value from 0.5 to 3.

2. A catalyst for the polymerization of propylene oxide to solid polymers consisting essentially of a condensation product of anhydrous ferric chloride and 2,3-epoxybutane, and corresponding approximately to the empirical formula $FeCl_3 \cdot (C_4H_8O)_n$ in which $n$ has a value from about 0.5 to about 3.

3. A product according to claim 2 in which the value of $n$ is at least 2, the product being isolated as a brown solid.

4. A process of polymerizing propylene oxide to form a solid polymer which comprises mixing it with a small proportion of a complex catalyst condensate of a ferric halide and 2,3-epoxybutane and corresponding to the empirical formula $FeX_3 \cdot (C_4H_8O)_n$ in which X is a halogen of atomic number from 17 to 35 and $n$ has a value from 0.5 to 3, and maintaining the mixture at a temperature of 20° to 150° C. for a time sufficient to effect polymerization.

5. A process of making solid homopolymeric propylene oxide which comprises mixing propylene oxide with from 0.1 to 5 percent by weight of a previously prepared complex catalyst condensate of ferric chloride and 2,3-epoxybutane containing approximately from 2 to 3 moles of combined propylene oxide per mole of combined ferric chloride ($FeCl_3$), heating the resulting mixture at a temperature of 70° to 100° C. for a time sufficient substantially to complete polymerization, and separating solid polypropylene oxide from the resulting product.

6. A process according to claim 5 in which heating is carried out for from 24 to 180 hours at about 80° C.

References Cited in the file of this patent

UNITED STATES PATENTS 2,706,181    Pruitt et al. _____ Apr. 12, 1955

U. S. DEPARTMENT OF COMMERCE
PATENT OFFICE

CERTIFICATE OF CORRECTION

Patent No. 2,811,491                                      October 29, 1957

Malcolm E. Pruitt et al.

It is hereby certified that error appears in the printed specification of the above numbered patent requiring correction and that the said Letters Patent should read as corrected below.

Column 1, line 54, for "$FeX_3 \cdot (C_4H_8)_n$" read -- $FeX_3 \cdot (C_4H_8O)_n$ --.

Signed and sealed this 18th day of March 1958.

(SEAL)
Attest:

KARL H. AXLINE                                                   ROBERT C. WATSON
Attesting Officer                                        Commissioner of Patents